United States Patent [19]

Yano et al.

[11] Patent Number: 5,014,558

[45] Date of Patent: May 14, 1991

[54] POLYURETHANE FOAM MODEL AND METHOD OF MEASURING STRESS DISTRIBUTION BY USING SUCH MODEL

[75] Inventors: Mitsuru Yano, Okagaki; Hisashi Yasuda, Kitakyusyu, both of Japan

[73] Assignee: Hitachi Metals, Ltd., Tokyo, Japan

[21] Appl. No.: 433,321

[22] Filed: Nov. 8, 1989

[30] Foreign Application Priority Data

Nov. 21, 1988 [JP] Japan .......................... 63-151541[U]
Apr. 12, 1989 [JP] Japan ................................ 1-92179

[51] Int. Cl.$^5$ ............................................. G01N 19/00
[52] U.S. Cl. ...................................... 73/804; 73/866.4
[58] Field of Search ...................... 73/804, 866.4, 762; 434/365

[56] References Cited

U.S. PATENT DOCUMENTS 3,924,455 12/1975 Bergishagen et al. ............ 73/804 X

FOREIGN PATENT DOCUMENTS 823958 4/1981 U.S.S.R. ................................ 73/804

OTHER PUBLICATIONS

Jidosha Gijutsukai Ronbunshu (The Journal of Automobile Technology Society), No. 27, 1983, pp. 84–90.
Castings, vol. 57, No. 8, pp. 485–490.

Primary Examiner—Jerry W. Myracle

[57] ABSTRACT

A model for measuring stress distribution constituted by a light, integral polyurethane foam having little unevenness in density, the polyurethane foam being at predetermined sites provided with undercoating layers, to each of which a resistance wire strain gauge is attached via an adhesive, each of the undercoating layers having a thickness of 50–300 μm and being made of a material which is unreactive with, hardly penetrable into and softer than the polyurethane foam. The stress distribution measurement is conducted by supporting the polyurethane foam model by one or more support members at positions corresponding to the restraint sites of an actual metal member, and applying a load to the polyurethane foam model at a position corresponding to the site of the actual metal member to which a load is actually applied, thereby measuring a stress distribution in the polyurethane foam model under substantially the same restraint conditions as in the actual metal members.

11 Claims, 7 Drawing Sheets

○—○ MODEL STRESS (CONVERTD)
●--● ACTUAL STRESS

POLYURETHANE FOAM MODEL AND METHOD OF MEASURING STRESS DISTRIBUTION BY USING SUCH MODEL

BACKGROUND OF THE INVENTION

The present invention relates to a model for measuring a stress distribution as a simulation model of a cast or forged product, and a method of measuring a stress distribution of a cast or forged product by using such a simulation model.

The stress distribution analysis of machine parts is usually carried out by computer simulation or by measuring stress distributions of actual parts. However, when the cast or forged metal products have complicated shapes, stress distributions are usually measured by first preparing samples of the same materials and applying a load thereto to measure their strains.

For the strain measurement of such cast or forged products, various methods are utilized, and particularly a strain gauge method is widely used for the reasons that it is relatively simple and suitable for quantitative measurement.

In this strain gauge method, a plurality of resistance wire strain gauges are attached onto a cast or forged product itself, and a load of the same intensity as an actual load is applied onto the cast or forged product to measure its stress distribution. Based on the stress distribution measurement results, various measures such as reinforcement of portions having insufficient strength, reduction of thickness of portions showing excessive rigidity, etc. are conducted. By repeating the stress distribution measurement, further working is conducted to achieve the desired shape of the cast or forged product showing satisfactory stress distribution.

Accordingly, until the optimum shape showing a uniform stress distribution is obtained, actual cast or forged products should be made several times, and stress distribution measurement should be repeated on each cast or forged product, taking a lot of time and labor. Particularly in the case of developing new parts, the period necessary for such development is inevitably long.

In view of this circumstance, it has been tried to produce models made of softer materials than actual cast or forged products and analyze their stress distributions from their load-strain relations, and as materials for such models, glass, epoxy resins, etc. have been proposed. In the case of stress distribution analysis by using models of such materials, a photoelasticity test method is sometimes used. However, it requires a highly trained operator and an expensive apparatus.

The inventors previously proposed the measurement of strain on an integral model constituted by a polyurethane foam which is attached with a plurality of resistance wire strain gauges at its predetermined sites and subjected to a load (Jidosha Gijutsukai Ronbunshu (The Journal of Automobile Technology Society), No. 27, 1983, pp. 84–90; Castings, Vol. 57, No. 8, pp. 485–490 (1985)). By a method using this polyurethane foam model, it is possible to know the general tendencies of stress distributions in actual cast or forged products. However, because of support sheets of resistance wire strain gauges and adhesives for bonding the gauges to models, large measurement errors are inevitable, and high skill is required for this measurement. Thus, it was proposed, as described in the article in "The Journal of Automobile Technology Society," to provide undercoating layers under adhesives for attaching the gauges. However, the application of undercoating layers alone was unable to solve the problems of measurement errors.

In addition, since the polyurethane foam has an extremely different face-friction coefficient from those of metals such as steel, etc. and has an extremely larger ratio of Young's modulus to specific gravity than those of metals, large measurement errors are generated depending upon supporting methods of polyurethane foam models.

OBJECT AND SUMMARY OF THE INVENTION

An object of the present invention is, therefore, to provide a polyurethane foam model for measuring stress distribution with small measurement errors in a strain gauge method.

Another object of the present invention is to provide a method of measuring stress distribution by using such polyurethane foam models.

As a result of intense research in view of the above objects, the inventors have found that by providing a proper undercoating layer at each gauge attaching site on a polyurethane foam model surface, the polyurethane foam model becomes less restrained by each strain gauge, whereby overall strain data become much less uneven, so that stress distribution measurement can be conducted with much higher accuracy. In addition, by supporting the polyurethane foam model with smallest frictions with support members, similar restraint conditions to those of actual metal members can be achieved, thereby enabling stress distribution measurement with high accuracy. The present invention is based upon these findings.

Thus, the model for measuring stress distribution according to the present invention is constituted by a light, integral polyurethane foam having little unevenness in density, the polyurethane foam being at predetermined sites provided with undercoating layers, to each of which a resistance wire strain gauge is attached via an adhesive, each of the undercoating layers having a thickness of 50–300 μm and being made of a material which is unreactive with, hardly penetrable into and softer than the polyurethane foam.

The method for measuring stress distribution by using a polyurethane foam model according to the present invention comprises supporting the polyurethane foam model by one or more support members at positions corresponding to the restraint sites of an actual metal member, and applying a load to the polyurethane foam model at a position corresponding to the site of the actual metal member to which a load is actually applied, thereby measuring a stress distribution in the polyurethane foam model under substantially the same restraint conditions as in the actual metal members.

DETAILED DESCRIPTION OF THE INVENTION

The polyurethane foam model of the present invention may be produced by any method, but it is preferable to cut a polyurethane foam block into a desired shape from the aspect of easiness. In this case, the polyurethane foam block should have good workability.

Since the polyurethane foam generally has about 1/1000 times as small a Young's modulus as those of cast iron, etc., it can be deformed under an extremely small load, making it possible to obtain stress distribution data with ease. However, when the Young's modulus of the polyurethane foam is lower than 0.5 kgf/mm$^2$, the polyurethane foam is too soft and deformable and has insufficient hardness, resulting in a decrease in measurement accuracy. On the other hand, when it exceeds 1.5 kgf/mm$^2$, the polyurethane foam is less deformable and easily cracked. Accordingly, the Young's modulus of the polyurethane foam is preferably within the range of 0.5-1.5 kgf/mm$^2$.

Since the polyurethane foam has innumerable pores on its surface, sufficient adhesion strength cannot be obtained by direct adhesion of resistance wire strain gauges, resulting in inaccurate detection of strains on the model surface by the gauges. Accordingly, undercoating layers are provided at gauge adhesion sites on the model. By the formation of the undercoating layers, the pores on the polyurethane foam surface are filled, providing good adhesion to the gauges.

In order that the application of the undercoating agent does not change the mechanical properties of the polyurethane foam, the undercoating agent should be unreactive with the polyurethane foam and should show extremely small permeability into the polyurethane foam. In addition, the layers formed by drying this undercoating agent should be softer than the polyurethane foam itself. If the undercoating layer is harder than the polyurethane foam, this layer restrains the deformation of the polyurethane foam, resulting in the detection of strains which are largely deviated from the true strains of the polyurethane foam. By using the undercoating layers softer than the polyurethane foam, the deformation of the polyurethane foam model is somewhat absorbed by the undercoating layers, but the percentages of the deformation absorbed are substantially uniform all over the polyurethane foam model. Therefore, the strain data obtained do not suffer from a decrease in accuracy.

Such undercoating agents are preferably synthetic rubber adhesives, particularly styrene-butadiene rubber adhesives. Such adhesives preferably contain 40% of synthetic rubbers and 60% of organic solvents such as cyclohexane, normal-heptane, petroleum naphtha, acetone, etc.

With respect to adhesives for adhering the resistance wire strain gauges onto the undercoating layers, any adhesives can be used as long as they are unreactive with the undercoating layers and show good adhesion strength with the undercoating layers. From the aspect of adhering operation, instantaneous adhesives are preferable.

Incidentally, strains detected by the resistance wire strain gauges are generally smaller than the actual strains because the surface of the polyurethane foam model is stiffened by the support sheets of the resistance wire strain gauges, the adhesives and the undercoating layers. Accordingly, the apparent strains detected by the resistance wire strain gauges should be calibrated. This calibration is carried out by using two groups of test pieces constituted by the same polyurethane foam as the model, one group with resistance wire strain gauges and the other group without resistance wire strain gauges, measuring strains of both test pieces to determine stress-strain relations and comparing them.

By such calibration, true strains can be determined from the apparent strains. However, since the ways of attaching the resistance wire strain gauges (ways of application and amounts of undercoating agents and adhesives) are inevitably different from site to site, there is unevenness among the apparent strains detected by the resistance wire strain gauges. This means that the apparent Young's moduli measured are different from site to site. The level of unevenness in Young's moduli depends upon the thickness of the undercoating layers: The thinner the undercoating layers, the larger the unevenness. On the other hand, if the undercoating layers are made thicker to reduce this unevenness, the sensitivity of the resistance wire strain gauges is lowered. In other words, if the sensitivity (ratio of true strain to apparent strain) is to be increased, the unevenness of the apparent Young's moduli becomes larger. Accordingly, it is necessary to find a proper range of the thickness of the undercoating layer for achieving an optimum balance of sensitivity and the unevenness of the apparent Young's moduli.

The unevenness of the apparent Young's moduli can be measured by attaching resistance wire strain gauges to a planar test piece constituted by the same polyurethane foam as the model, bending the test piece such that the stress is applied uniformly, and comparing the outputs of the resistance wire strain gauges. In the polyurethane foam model of the present invention, the unevenness of the apparent Young's moduli is necessary to be within ±10%. To this end, the thickness of each undercoating layer should be 50-300 μm. When the thickness is lower than 50 μm, influence by the stiffness of the gauge cannot be alleviated, resulting in the unevenness of apparent Young's moduli exceeding ±10%. On the other hand, when the thickness is larger than 300 μm, the deformation of the polyurethane foam model is excessively absorbed, resulting in too small detection outputs from the gauges. Specifically, in order that the apparent Young's moduli show unevenness within ±10%, the apparent strains detected by the gauges should be 4% or more of the actual strains. When the undercoating layers are thicker than 300 μm, the apparent strains are lower than 4% of the actual ones, resulting in large measurement errors.

The polyurethane foam model for measuring stress distribution according to the present invention is applicable not only to integral cast or forged metal products but also to composite metal members constituted by a plurality of metal members. In the latter case, polyurethane foams having different Young's moduli whose proportions are equal to the ratios of Young's moduli of the constituent metal members are used to produce composite models.

In the present invention, since the polyurethane foam for the model has a Young's modulus in the range of 0.5–1.5 kgf/mm$^2$, it can be used for a composite model for measuring stress distribution as long as the composite metal member to be measured through its polyurethane foam model is constituted by metal members showing Young's moduli whose ratios are at most 3:1. Accordingly, not only composite metal members constituted by cast iron members alone but also those constituted by steel members, aluminum members, etc. can be simulated by their polyurethane foam models.

Next, the method of measuring stress distribution according to the present invention will be described below.

For the stress distribution measurement, the polyurethane foam model is set under the same restraint conditions as those of an actual metal member, and outputs of resistance wire strain gauges are read out. It should be noted, however, that the polyurethane foam shows a larger face-friction coefficient than the metal member such as a steel member, and that the polyurethane foam has a larger ratio of specific gravity to Young's modulus than cast or forged products. Accordingly, the restraint conditions in the polyurethane foam model are different from those in the actual metal member, resulting in large measurement errors.

Figure 2:
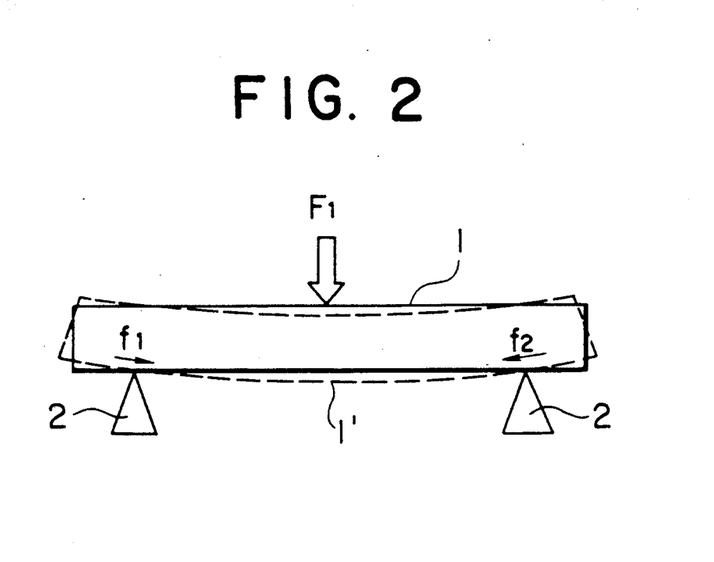

First, the measurement errors caused by the difference in face-friction coefficients will be described below. As shown in FIG. 2, when a model 1 is placed on a pair of support members 2, 2, and when a load $F_1$ is applied onto the model 1, the model 1 is deformed as shown by the broken line 1'. In this case, friction forces $f_1$, $f_2$ are generated at sites where the model 1 is in contact with the support members 2, 2. These friction forces $f_1$, $f_2$ lead to such measurement results that would be obtained as if a smaller force than the actual load $F_1$ were applied onto the model 1.

Figure 1:
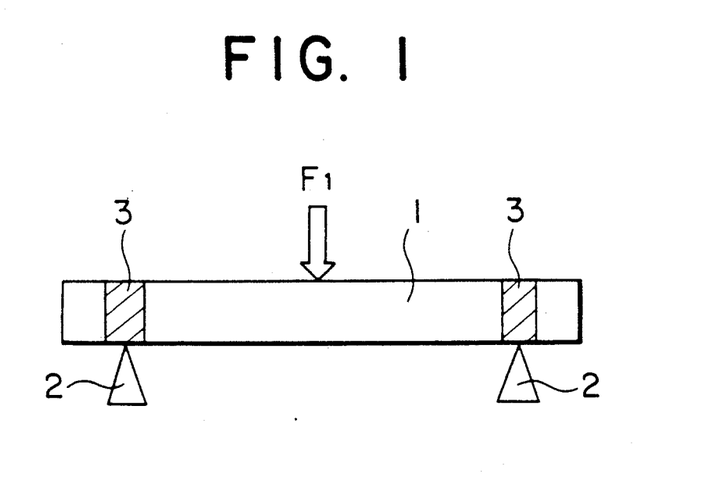
FIGS. 1–5 are respectively schematic views showing various methods of measuring stress distributions by using polyurethane foam models.

To solve the above problem, the sites of the polyurethane foam model which are brought into contact with the support members are treated to show smaller frictions by applying tapes or coatings with smooth surfaces. The tapes or coatings may be applied to the contact sites of the polyurethane foam model only, or to the overall surface of the model. Further, the support members may be covered by tapes or coatings. FIG. 1 schematically shows an example in which the model 1 is applied with tapes 3, 3 having smooth surfaces at contact sites with the support members 2, 2. By these tapes 3, 3, the frictions between the model 1 and the support members 2, 2 are greatly reduced so that they become closer to frictions generated when an actual metal member is brought into contact with the support members.

Figure 3:
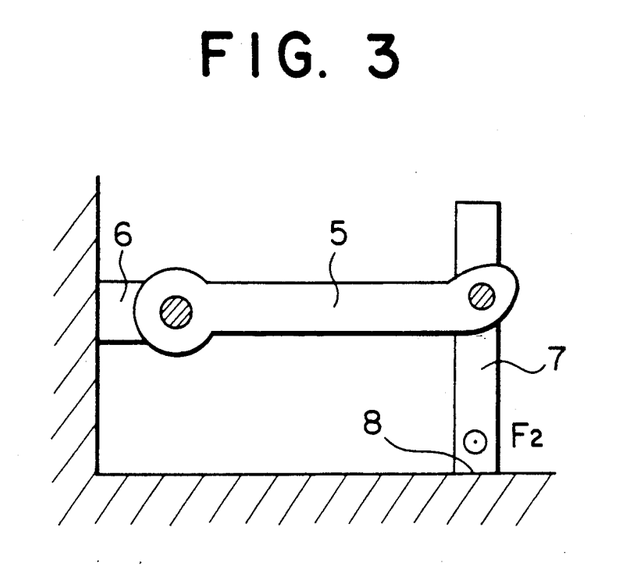

Next, the measurement errors caused by the difference in the specific gravity / Young's modulus ratio will be described below. The polyurethane foam has a larger weight relative to Young's modulus than a cast or forged product. Accordingly, even if the polyurethane foam model is simply supported in the same manner as in the case of an actual metal member, the restraint conditions would be different from those of the actual metal member, resulting in large measurement errors. Namely, a larger friction is generated relative to the Young's modulus in the case of the polyurethane foam model than in the case of the actual metal member. To explain this, please see FIG. 3 in which a model 5 having two holes at both ends is pivotally supported by a stationary jig 6 at its one end and also pivotally supported by a movable jig 7 at the other end. When a load $F_2$ is applied to the jig 7 in a direction from back side to front side of the paper (perpendicular to the plane of FIG. 3) to measure a lateral bending stress of the model 5, a force actually applied to the model 5 is smaller than $F_2$ due to a friction in a contact surface between the jig 7 and the floor 8. To solve this problem, the contact surface between the jig 7 and the floor 8 can be made smooth, thereby reducing the measurement errors. In the alternative, rollers may be placed under the jig 7. However, these methods may still cause substantial measurement errors. This is due to the fact that since a ratio of specific gravity to Young's modulus is extremely large in the case of the polyurethane foam, a slight friction would cause large measurement errors.

Figure 4:
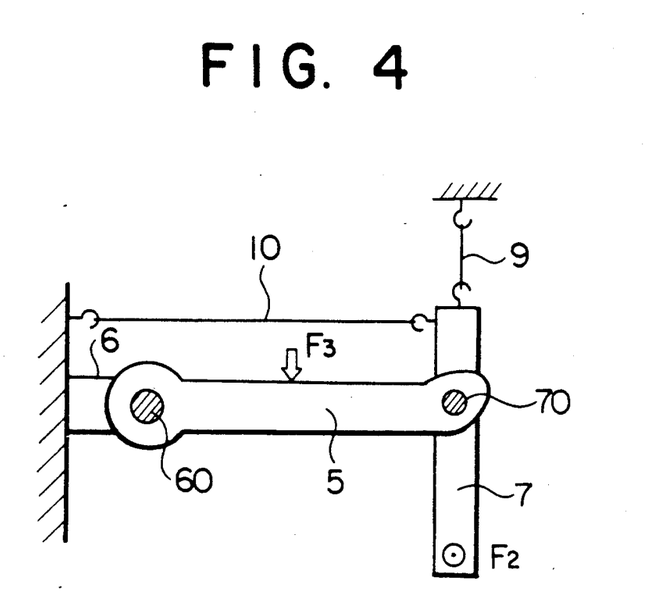

To solve this problem, a free end of the polyurethane foam model needs only be supported by a dangling yarn. FIG. 4 shows one example in which the model 5 is supported by the jig 7 which is supported by a yarn 9, to avoid a friction from being generated on the bottom surface of the jig 7. Incidentally, the jig 7 is also supported by a lateral yarn 10 to keep its position. By this structure, a friction due to the weight of the model 5 and the jig 7 is kept minimum, thereby achieving stress distribution measurement with small errors.

Incidentally, in FIG. 4, the model 5 is pivotally supported by the jigs 6 and 7, and the contact surfaces 60 and 70 between the model 5 and the jigs 6 and 7 are provided with tapes or coatings for reducing frictions therebetween. By this structure, in the case of stress distribution measurement by applying a load $F_3$ to the model 5 from the above, a large measurement error due to frictions between the jigs and the model can be prevented.

Figure 5:
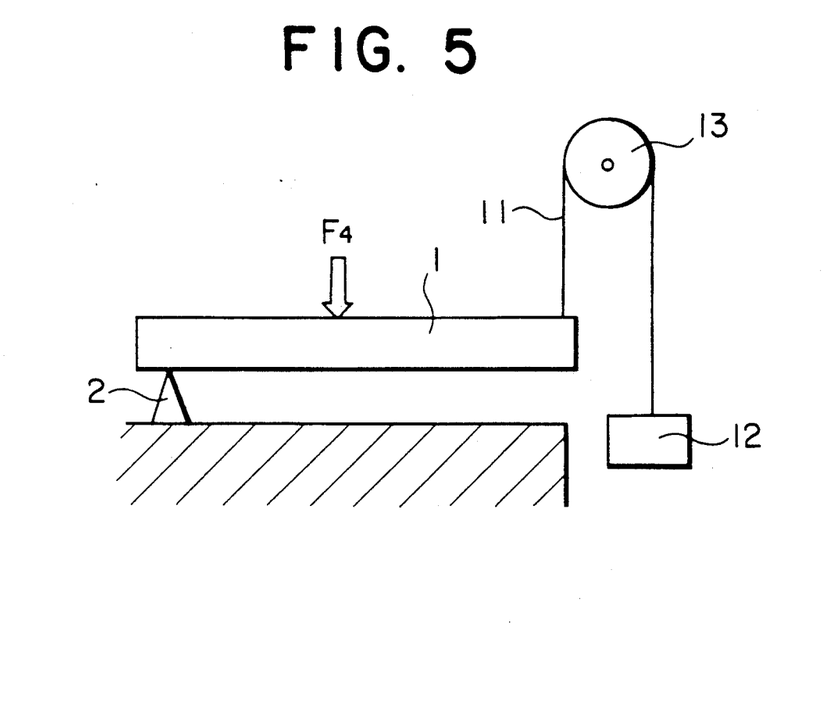

As shown in FIG. 5, the stress distribution measurement of the present invention can also be conducted by supporting a model 1 by a triangular cross-sectioned support 2 and a yarn 11. The yarn 11 is connected to a weight 12 via a pulley 13. When a load $F_4$ is applied to the model 1, the weight 12 should be increased to maintain a balance with the model 1 for stress distribution measurement.

As shown in FIGS. 4 and 5, by supporting one end of the model by a yarn, no friction is generated, because when a load is applied to the model, the yarn hanging the model is movable vertically.

In the method of the present invention, as a method of applying a load to the model, it is preferable to use a yarn in the case of a point load, or a tape in the case of a face load. With respect to the support members, they are also preferably made of a polyurethane foam. Incidentally, a means for applying a load to the model should be made of a light material such as a balsa to minimize an influence by the weight of the means itself.

By using a polyurethane foam as a material for a model for measuring stress distribution, the model is easily prepared, which makes it possible to easily find out an optimum shape showing a uniform stress distribution for a short period of time by repeating stress distribution measurements.

By applying undercoating layers which are unreactive with and impermeable into the polyurethane foam and also softer than the polyurethane foam, the surface restraint of the polyurethane foam model by the adhesion with resistance wire strain gauges can be alleviated, thereby reducing unevenness of the apparent Young's moduli on the overall surface of the polyurethane foam model. Accordingly, a high-accuracy measurement can be achieved with resistance wire strain gauges.

With respect to the stress distribution measurement of a composite metal member constituted by a plurality of metal parts, the polyurethane foams having different stiffnesses whose ratios are proportional to the ratios of the Young's moduli of the metal parts can be used.

In addition, in the stress distribution measurement of the present invention, since tapes or coatings are applied to minimize frictions between a model and support members to achieve the same restraint conditions as those of actual metal parts, or since one end of the model is hanged by a yarn, stress distribution measurement can be achieved with minimum errors.

The present invention will be described in detail by the following Examples.

EXAMPLE 1

Figure 6:
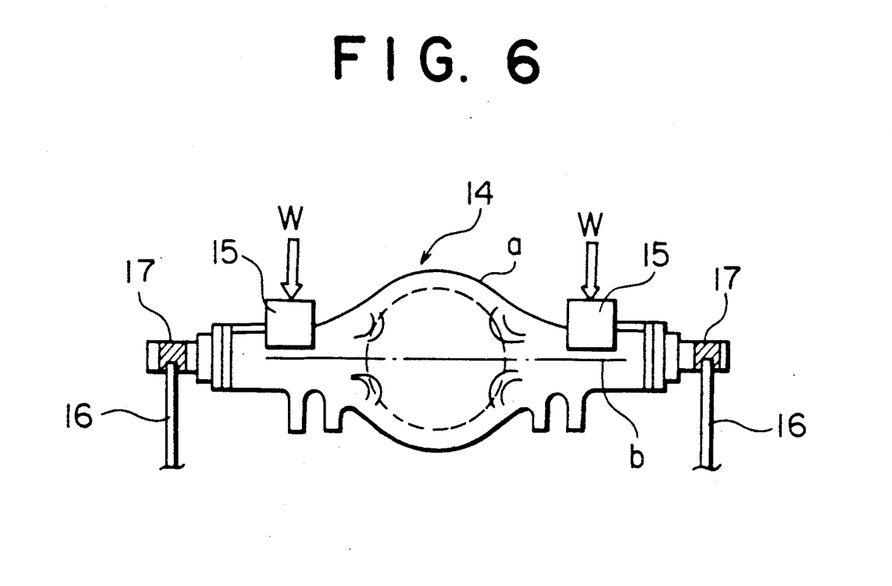
FIG. 6 is a side view showing a stress distribution-measuring model in the same shape as that of a rear axle of a truck, which is under measurement of stress distribution.

A model 14 in the shape of a rear axle of a truck as shown in FIG. 6 was prepared by cutting a polyurethane foam block at a reduction ratio of ½. The polyurethane foam block had a density of $0.06 \pm 0.006$ g/cm$^3$ and a Young's modulus of 1.03 kgf/mm$^2$.

A plurality of resistance wire strain gauges were attached to this model 14 along two lines "a" and "b" extending axially. Each gauge was attached by applying an undercoating agent (Bond G Clear, manufactured by Konishi K.K.), leaving it to stand for 5 minutes, applying the same undercoating agent again, and after 2 hours applying an adhesive (Strain Gauge Cement CC15B, trade name), and immediately attaching a commercially available iron-made monoaxial resistance wire strain gauge. Incidentally, the undercoating layer had a thickness of about 100 μm.

This model was supported by two support members 16, 16 at positions of wheels as shown in FIG. 6, and a load of 2 kgf was applied onto the model 14 at each spring seat position 15, 15 equally. Incidentally, to reduce frictions between the model 14 and the support members 16, 16, tapes 17, 17 were applied onto the model 14.

Figure 7A:
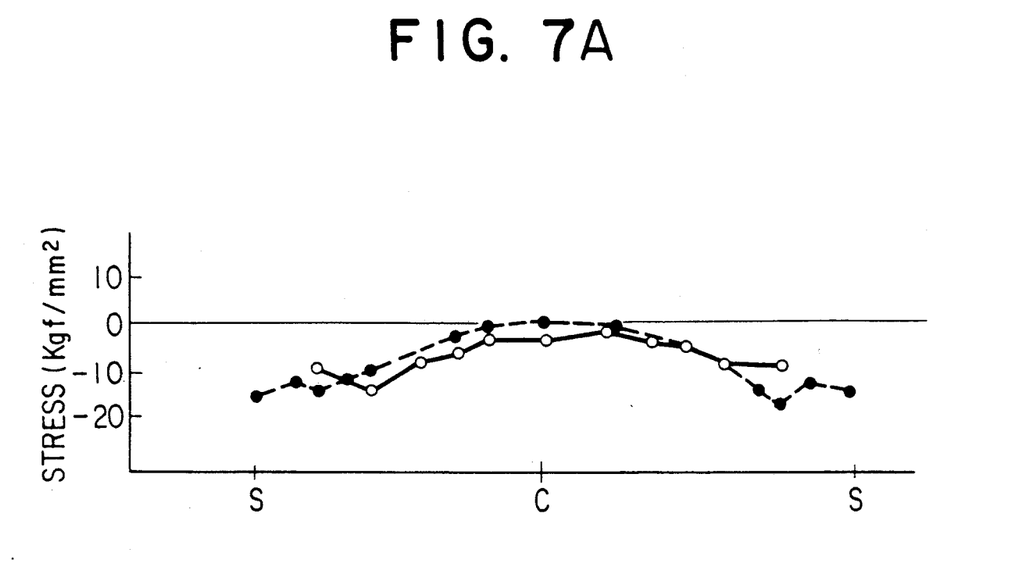
FIG. 7A is a graph showing a stress distribution of the model shown in FIG. 6
Figure 7B:
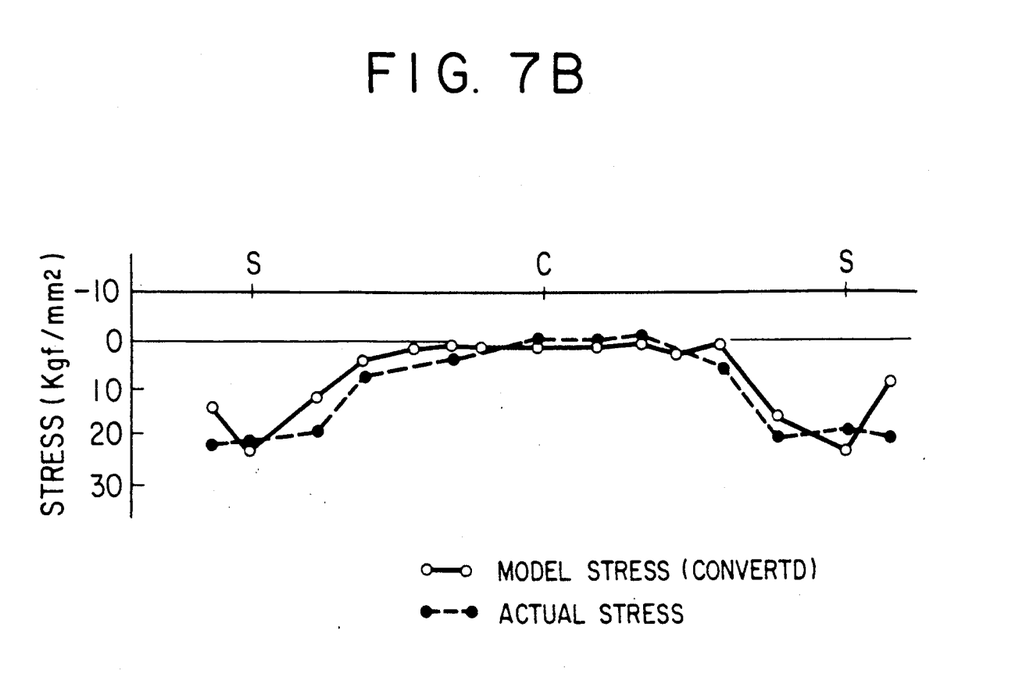
FIG. 7B is a graph of the stress distribution of the actual rear axle of a truck.

Next, the same stress distribution measurement was conducted on an actual rear axle made of cast iron. FIG. 7A shows the stress distribution measurement results conducted on the model 14 FIG. 7B, on and the actual axle. In FIG. 7, "C" denotes a center position of the model (axle), and "S" denotes a spring seat position. Also, graphs in (a) show stress distribution data obtained along the line "a" in FIG. 6, and graphs in (b) show those obtained along the line "b." It should be noted that the stress applied to the polyurethane foam model 14 was multiplied to the same level as that of the actual axle. As is clear from FIG. 7, both stress distributions in FIGS. 7A and 7B show extremely similar tendencies between the polyurethane foam model 14 and the actual axle.

EXAMPLE 2

Figure 9A:
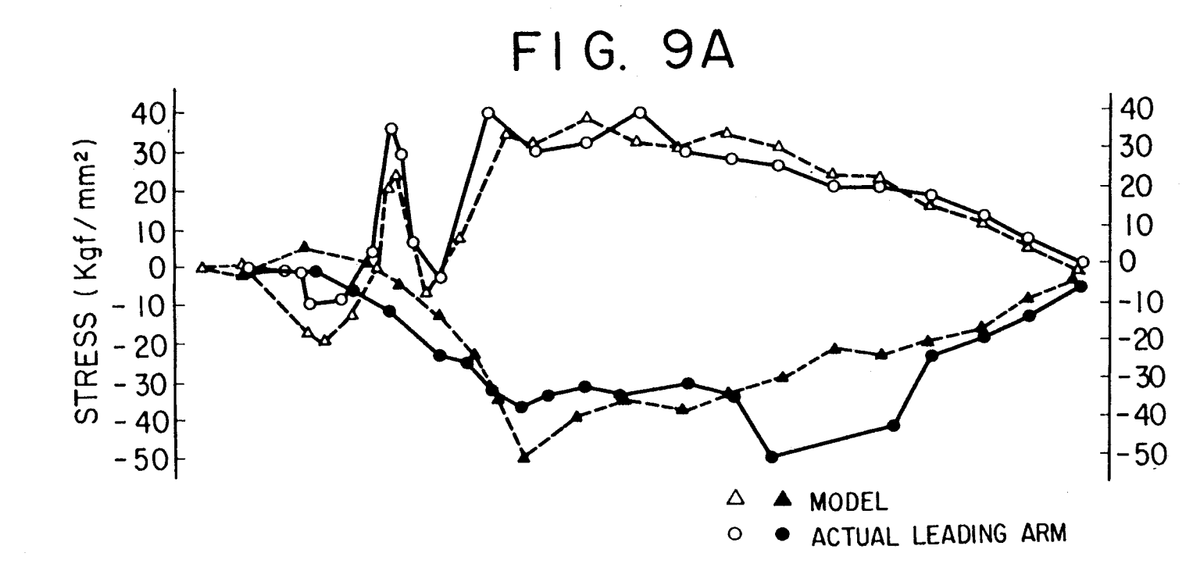
FIG. 9A is a graph showing stress distribution measurement results on the vehicle leading arm and on its model.
Figure 9B:
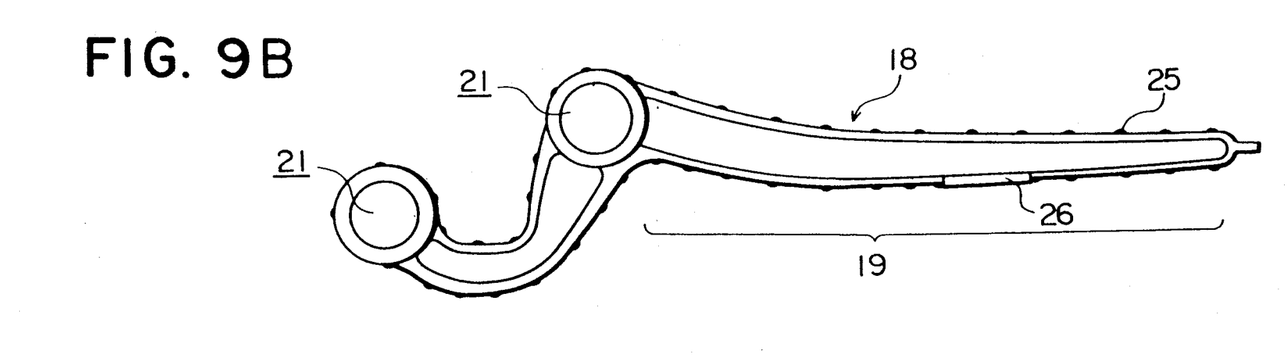
FIG. 9B is a side view showing an actual leading arm.

With respect to a leading arm 18 for a vehicle in a shape shown in FIG. 9B, a polyurethane foam model at a reduction ratio of ⅓ was prepared by cutting a polyurethane foam block. The polyurethane foam block used had a density of 0.06 g/cm$^3$ and a Young's modulus of 1.0 kgf/mm$^2$. This leading arm 18 had a U-shaped portion between two apertures 21, 21 and a substantially linear arm portion 19. Although the arm portion 19 is provided with a mount seat 26, the polyurethane foam model for stress distribution measurement did not have such a mount seat 26.

Figure 8:
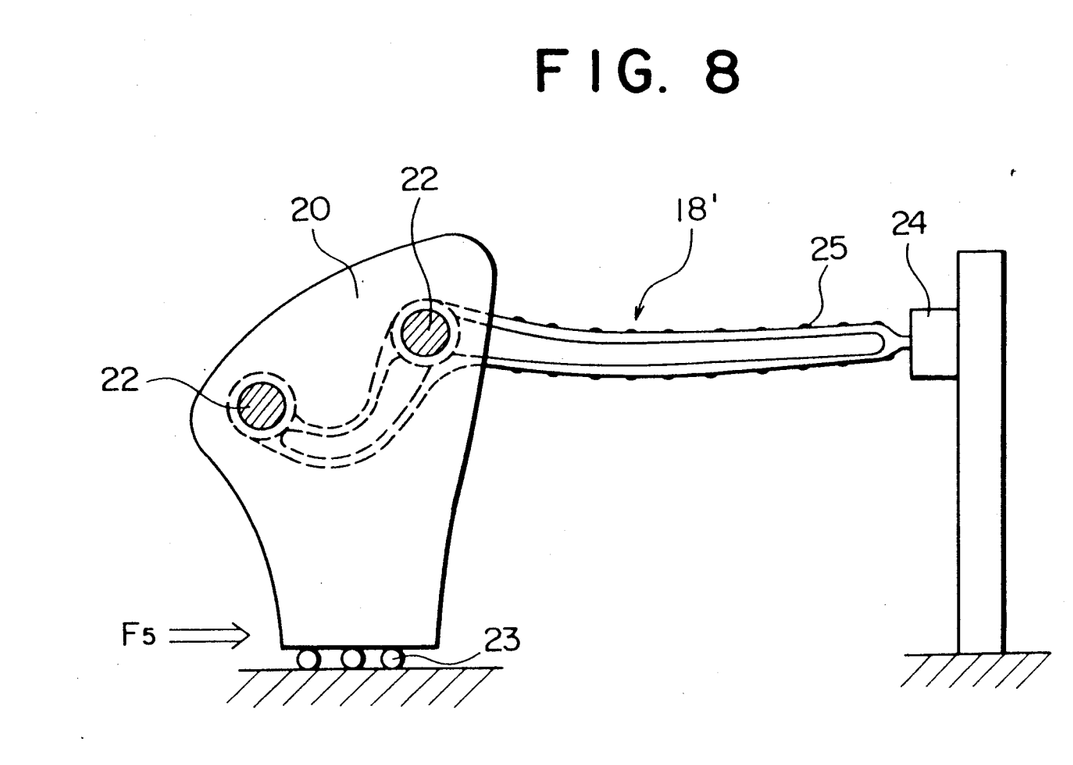
FIG. 8 is a schematic side view showing a model for measuring stress distribution in the same shape as that of a vehicle leading arm which is under measurement of stress distribution.

FIG. 8 schematically shows the stress distribution measurement by using a polyurethane foam model 18' for the leading arm 18. The model 18' was fixed by a pair of iron plate jigs 20, 20 with two pins 22, 22 penetrating through the apertures 21, 21 of the model 18'. An end of the arm portion was fixed by a spherical bearing 24 such that the end of the arm portion was subjected to a thrust load by an iron ball of the spherical bearing 24. A number of rollers 23 were placed between the iron plate jigs 20, 20 and a floor to reduce the friction therebetween.

The model 18' was provided with a plurality of resistance wire strain gauges 25 with substantially the same intervals as shown in FIG. 8. The resistance wire strain gauges used and the method of attaching them were the same as in Example 1. Incidentally, each undercoating layer had a thickness of about 100 μm.

As shown in FIG. 8, a load $F_5$ of 0.3 kgf was applied to lower portions of the iron plate jigs in the axial direction of the leading arm model 18'.

The same stress distribution measurement was conducted on the actual leading arm 18. FIG. 9A shows stress distribution measurement results on the model 18' and the actual leading arm 18.

As mentioned above, the model 18' did not have a mount seat 26 which was possessed by the actual leading arm 18. Accordingly, the stress distribution measurement results are somewhat different in this portion. However, in the other portions, both results are extremely identical. Incidentally, in FIG. 9A, $\bigcirc$ and $=\triangle$ show the stress distributions on the upper side of the leading arm model 18', and ● and ▲ show the stress distributions on the lower side of the leading arm model 18'.

EXAMPLE 3

Figure 10:
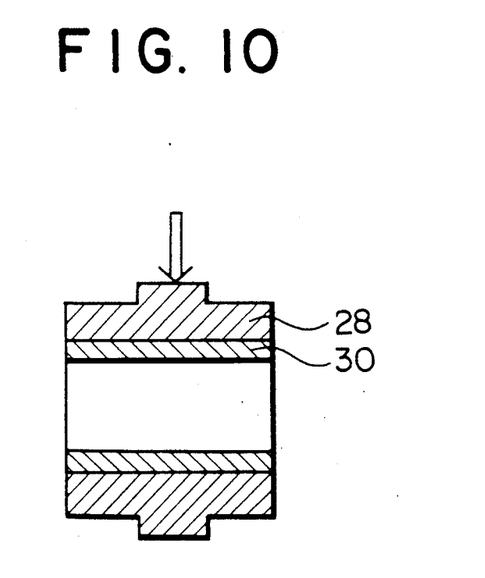
FIG. 10 is a cross-sectional view showing a stress distribution-measuring model for a composite metal member.

With respect to a composite metal member constituted by a cylindrical steel bracket and an aluminum pipe inserted into the steel bracket as shown in FIG. 10, its polyurethane foam model was produced for stress distribution measurement.

Since steel had a Young's modulus of 21,000 kgf/mm$^2$ and aluminum had a Young's modulus of 7000 kgf/mm$^2$, their ratio was 3:1.

Accordingly, an outer tubular portion 28 of the polyurethane foam model was integrally formed from a polyurethane foam block having a Young's modulus of 1.5 kgf/mm$^2$ by cutting, and an inner tubular portion 30 was integrally formed from a polyurethane foam block having a Young's modulus of 0.5 kgf/mm$^2$ by cutting.

The resistance wire strain gauges were attached onto an outer surface of this outer tubular portion 28 and an inner surface of the inner tubular portion 30 at predetermined positions in the same manner as in Example 1.

In this state, as large a load as 1/14000 of an actual load was applied to the outer cylindrical steel portion 28 in a direction as shown by the arrow in FIG. 10 to conduct stress distribution measurement.

The same stress distribution measurement was conducted on an actual composite metal member having the same structure as in FIG. 10. As a result, it was found that the data predicted by the polyurethane foam model were extremely identical with those obtained in the actual composite metal member.

In Examples 1 and 2, models having a half size of the actual metal members were used, but the reduction size of the model may be determined arbitrarily. When a cast or forged product is relatively small, the reduction ratio can be optimized to achieve accurate measurement.

As described above in detail, the polyurethane foam models for measuring stress distribution according to the present invention are extremely light and easy to handle and show good workability, and the stress distribution measurements by using such polyurethane foam models can predict the actual stress distributions of cast or forged products with extremely high accuracy. Accordingly, the development of such cast or forged metal members can be conducted in an extremely shortened period with reduced costs.

By the stress distribution measurement method of the present invention, the stress distribution measurement can be conducted on the polyurethane foam models under the same restraint conditions as those on actual metal parts. Accordingly, the stress distribution can be measured with extremely small errors.

What is claimed is:

1. Apparatus for measuring stress distribution of a member comprising a light, integral polyurethane foam model having little unevenness in density, one or more undercoating layers attached to said polyurethane foam at predetermined model sites, [provided with undercoating layers, to each of which a] one or more resistance wire strain gauges attached to each of said undercoating layers at said predetermined sites via an adhesive, each of said undercoating layers having a thickness of 50–300 μm and being made of a material which is unreactive with, hardly penetrable into and softer than the polyurethane foam of said model.

2. The apparatus for measuring stress distribution according to claim 1, wherein the polyurethane foam of said model has a Young's modulus of 0.5–1.5 kgf/mm$^2$, the unevenness of an apparent Young's modulus among said predetermined sites to which said resistance wire strain gauges are attached is within ±10%, and apparent strains of said model detected by said resistance wire strain gauges being 4% or more of true strains of said model.

3. The apparatus for measuring stress distribution according to claim 1, wherein said member is a composite member having portions formed of materials having different Young's modulus, wherein said model is constituted by a plurality of polyurethane foam portions having different stress distributions, the proportions of Young's moduli between said polyurethane foam portions being equal to the proportions of Young's moduli between constituent portions of said composite member.

4. A method of measuring stress distribution of a member by using a polyurethane foam model, comprising attaching resistance strain gauges to the surface of said model at predetermined model sites spaced about 50–300 μm from the respective model site surface by respective undercoating layers, said attaching step including the step of selecting undercoating layers of a material unreactive to the polyurethane foam, and softer and hardly penetrable into the foam for spacing said resistance strain gauges, supporting said polyurethane foam model by one or more support members at positions corresponding to the restraint sites of an actual member, applying a load to said polyurethane foam model at a position corresponding to the site of the actual member to which a load is actually applied, thereby measuring a stress distribution in said polyurethane foam model under substantially the same restraint conditions as in the actual member.

5. The method according to claim 4, wherein at sites where said polyurethane foam model is in contact with said support members, said polyurethane foam model and/or said support members are provided with tapes or coatings for decreasing friction between said polyurethane foam model and said support members.

6. The method according to claim 4, wherein at least one end of said model is supported by a yarn.

7. The method according to claim 4, wherein at least one of said support members is a sharp-tipped member on which said model is disposed, and/or a jig to which said polyurethane foam model is pivotally mounted.

8. A method of measuring stress distribution by using a polyurethane foam model, comprising supporting said polyurethane foam model by one or more support members at positions corresponding to the restraint sites of an actual member wherein at sites where said polyurethane foam model is in contact with said support members, said polyurethane foam model and/or said support members are provided with tapes or coatings for decreasing friction between said polyurethane foam model and said support members, and applying a load to said polyurethane foam model at a position corresponding to the site of the actual metal member to which a load is actually applied, thereby measuring a stress distribution in said polyurethane foam model under substantially the same restrain conditions as in the actual member.

9. The method according to claim 8, wherein at least one end of said model is supported by a yarn.

10. A method of measuring stress distribution by using a polyurethane foam model, comprising supporting said polyurethane foam model by one or more support members at positions corresponding to the restraint sites of an actual member, wherein at least one end of said model is free and is supported by a yarn, and applying a load to said polyurethane foam model at a position corresponding to the site of the actual member to which a load is actually applied, thereby measuring a stress distribution in said polyurethane foam model under substantially the same restraint conditions as in the actual member.

11. The method according to claim 9, wherein at least one of said support members is a sharp-tipped member on which said model is disposed, and/or a jig to which said polyurethane foam model is pivotally mounted.

* * * * *

UNITED STATES PATENT AND TRADEMARK OFFICE
CERTIFICATE OF CORRECTION

PATENT NO. : 5,014,558

DATED : May 14, 1991

INVENTOR(S) : YANO et al.

It is certified that error appears in the above-identified patent and that said Letters Patent is hereby corrected as shown below:

Claim 1, col. 9, lines 28-29, delete "[provided with undercoating layers, to each of which a]".

Signed and Sealed this

Twenty-fourth Day of November, 1992

*Attest:*

DOUGLAS B. COMER

*Attesting Officer*   Acting Commissioner of Patents and Trademarks